(No Model.)

F. MANKEY.
ART OF PRODUCING OPEN WORK PANELS.

No. 332,722.  Patented Dec. 22, 1885.

WITNESSES
Gustave Dieterich
Fred Huetiooght

Frederick Mankey INVENTOR

UNITED STATES PATENT OFFICE.

FREDERICK MANKEY, OF WILLIAMSPORT, PENNSYLVANIA.

ART OF PRODUCING OPEN-WORK PANELS.

SPECIFICATION forming part of Letters Patent No. 332,722, dated December 22, 1885.

Application filed November 2, 1885. Serial No. 181,610. (No model.)

*To all whom it may concern:*

Be it known that I, FREDERICK MANKEY, of Williamsport, Lycoming county, Pennsylvania, have invented a new and useful Improvement in the Art of Producing Open-Work Panels, of which the following is a specification.

My invention relates to a new method of producing open-work panels of wood, such as are commonly used for decorative purposes. At the present time these panels are cut out by means of the band or gig saw. This involves much skill on the part of the operator, the careful following of the entire outline of the pattern with the saw, and a large outlay of time, and consequent expense. The difficulties are increased by the fact that any carelessness or error on the part of the operator or slip of the tool may greatly injure the work in hand through breaking one of the small partitions between the interstices, so that, in brief, the making of these panels is now generally regarded as "nice work" to be entrusted only to skilled hands. For this reason, among others, the use of open-work panels is now restricted to fine cabinet-making, and they are usually produced in choice and costly woods. One of their chief employments is in the cases of upright piano-fortes and as music-supports in the same.

By my hereinafter-described process the manufacture of open-work panels is taken completely out of the domain of fine work, and rendered possible even to the most unskilled labor. The only manual work involved is the gluing together of certain large parts, which, being produced by machinery with exact accuracy as to correspondence, requires scarcely any special skill. For the rest there is nothing to do but attend the feeding of the material to the tools, which requires about the same degree of ability on the part of the operator as does the care of feeding logs to saw-mills.

Figure 1:
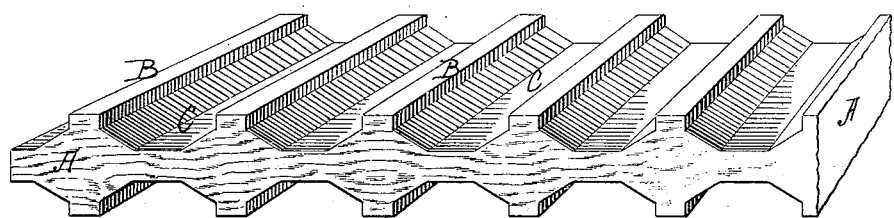
Figure 2:
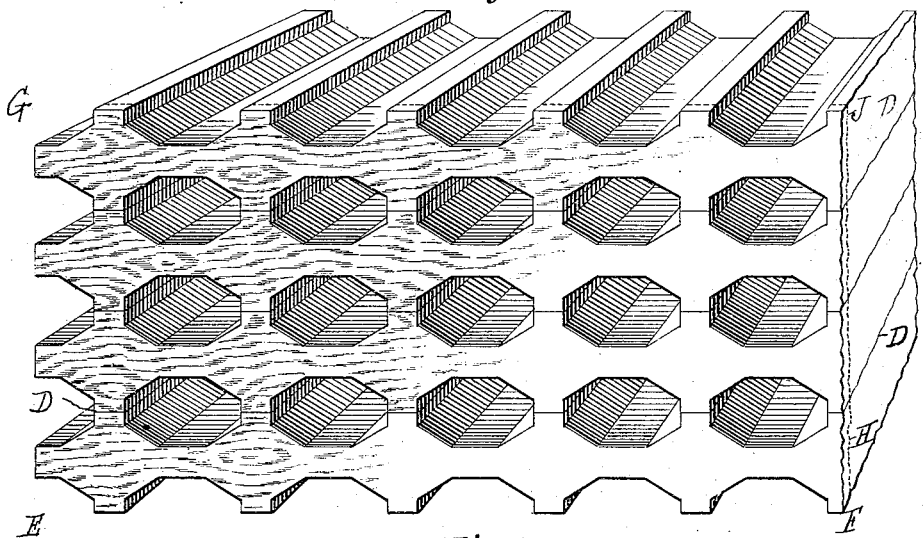
Figure 3:
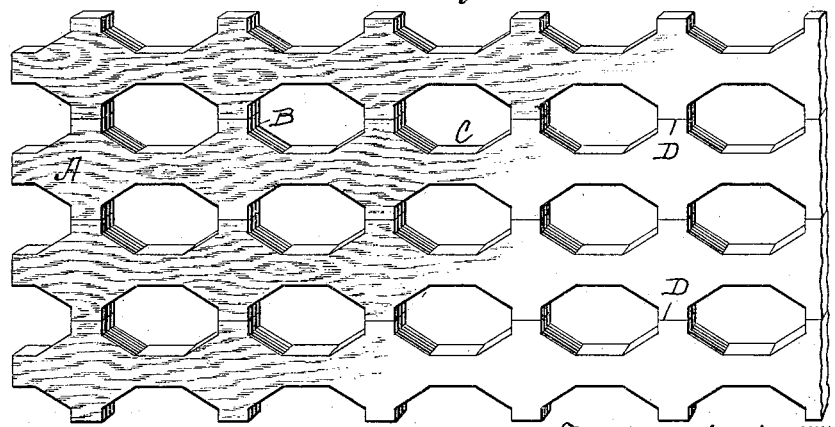

My process is as follows: Having selected a plank or board of the wood of which the panel is to be made, I produce upon both surfaces thereof (the same having first been made true and parallel) a new configuration—such, for example, as the series of elevations and depressions shown at B and C, Fig. 1, A being the plank. It is essential that the configuration should include elevations and depressions substantially as represented, but not necessarily, of course, of the particular design or conformation shown, because I can vary this design in a great many ways so as to produce differently-appearing panels. It is also essential that the elevations and depressions should extend transversely the grain of the wood, which grain in a board or plank runs longitudinally. After both sides of the plank have been cut in the above manner, I divide the same into a number of short pieces, each equaling the length of the panel which it is desired to produce. I then place these pieces one upon the other, as shown in Fig. 2, with the elevations B meeting and the depressions C corresponding, so as to form openings through the entire mass, and I glue said pieces together at the places of contact of said elevations—as, for example, along the line D. The length of the several pieces thus joined together, I have already stated, should equal the length of the intended panel. By "length" I mean the dimension between the letters E F in Fig. 2. As many of said pieces should be joined as will unitedly equal the width of the intended panel, and by "width" I mean the dimensions between the letters G E in Fig. 2. In this way I make what I term a "composite block." This is substantially a solid mass of wood having openings through it, as already described, the cross-section of which represents the intended panel. It now simply remains to saw this block into thin slabs in the plane indicated by the dotted line H J, Fig. 2, and the result is shown in Fig. 3, the same being an open-work or reticulated panel.

Obviously I can make my composite block of any desirable size, and so produce panels of any desired dimensions. So, also, by cutting the final slabs thicker or thinner I can diminish or increase the number which may be produced from a given quantity of material. This facility I can apply with advantage in making veneered open-work panels. Thus I can make two composite blocks, as in Fig. 2, of precisely the same pattern but of different woods—one of cheap material, the other of fine or rare wood. In such case the block of cheap wood could be cut into comparatively thick panels, and that of fine wood into thin veneers. As the veneers and panels would exactly correspond in configuration, it would simply remain to glue the former upon the latter.

I claim as my invention—

The improvement in the art of producing open-work or reticulated panels, substantially as hereinbefore described, which consists, first, in producing a configuration of alternate elevations and depressions upon the parallel and opposite sides of a board or plank and extending transversely the grain thereof; second, joining two or more of said boards in contact, one upon the other, at the meeting faces of their elevations; and, third, dividing the mass so formed longitudinally into slabs or panels.

FREDERICK MANKEY.

Witnesses:
C. F. MANKEY,
CHARLES WOELLMER.